(12) United States Patent
Kristensen (10) Patent No.: US 9,450,385 B2
(45) Date of Patent: Sep. 20, 2016

(54) SUBSEA SWITCHGEAR (71) Applicant: Siemens Aktiengesellschaft, München (DE)

(72) Inventor: Knut Schonhowd Kristensen, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/898,771

(22) PCT Filed: Jun. 20, 2014

(86) PCT No.: PCT/EP2014/062990
§ 371 (c)(1),
(2) Date: Dec. 16, 2015

(87) PCT Pub. No.: WO2015/010833
PCT Pub. Date: Jan. 29, 2015

(65) Prior Publication Data
US 2016/0141843 A1 May 19, 2016

(30) Foreign Application Priority Data
Jul. 25, 2013 (EP) .................................... 13178033

(51) Int. Cl.
*H02B 1/22* (2006.01)
*H02B 13/00* (2006.01)
(Continued)

(52) U.S. Cl.
CPC ............. *H02B 1/22* (2013.01); *H02B 13/045* (2013.01); *H02G 9/02* (2013.01); *H01H 2033/566* (2013.01)

(58) Field of Classification Search
CPC ........ H02B 1/22; H02B 5/06; H02B 13/035; H02B 13/045; H02G 9/02; H01H 2033/566
See application file for complete search history.

(56) References Cited

U.S. PATENT DOCUMENTS 4,247,787 A * 1/1981 Page .................... H02B 1/24
307/112
4,467,220 A * 8/1984 Page .................... H02B 1/24
307/112

(Continued)

FOREIGN PATENT DOCUMENTS

| EP | 2442417 A1 | 4/2012 |
|---|---|---|
| WO | WO-2012034984 A2 | 3/2012 |
| WO | WO-2012164029 A2 | 12/2012 |

OTHER PUBLICATIONS

Extended European Search Report dated Mar. 25, 2014.
(Continued)

*Primary Examiner* — Robert J Hoffberg
(74) *Attorney, Agent, or Firm* — Harness, Dickey & Pierce, P.L.C.

(57) ABSTRACT

A subsea switchgear is provided. The subsea switchgear includes a first power input for receiving electric power from a power source and a second power input for receiving electric power from a power source. It further includes a power distribution bus and a first circuit breaker coupled between the first power input and the power distribution bus. The first circuit breaker is configured to be capable of disconnecting the first power input from the power distribution bus. A second circuit breaker is further coupled between the second power input and the power distribution bus. The second circuit breaker is configured to be capable of disconnecting the second power input from the power distribution bus.

27 Claims, 4 Drawing Sheets (51) Int. Cl.
    *H02G 9/02*     (2006.01)
    *H02B 13/045*     (2006.01)
    *H01H 33/56*     (2006.01)

(56) References Cited

U.S. PATENT DOCUMENTS

| | | | | |
|---|---|---|---|---|
| 4,503,481 A * | 3/1985 | Fujiya | H02B 5/06 | 200/50.21 |
| 4,752,860 A * | 6/1988 | Romanet | H02B 5/06 | 361/602 |
| 4,884,166 A * | 11/1989 | Thuries | H02B 5/06 | 361/604 |
| 4,890,193 A * | 12/1989 | Tsubaki | H02B 5/06 | 361/612 |
| 6,016,247 A * | 1/2000 | Dams | H02B 13/035 | 361/602 |
| 6,292,356 B1 * | 9/2001 | Yamagiwa | H02B 5/06 | 218/70 |
| 6,399,911 B1 * | 6/2002 | Tsuzura | H02B 13/065 | 218/43 |
| 6,538,877 B2 * | 3/2003 | Yamagiwa | H02B 5/06 | 218/70 |
| 7,477,506 B2 * | 1/2009 | Salamanca Segoviano | H02B 5/06 | 361/602 |
| 7,952,855 B2 * | 5/2011 | Sletten | E21B 33/0355 | 218/118 |
| 2013/0215543 A1 | 8/2013 | Hoeven | | |
| 2014/0097678 A1 | 4/2014 | Thibaut et al. | | |

OTHER PUBLICATIONS

International Search Report PCT/ISA/210 for International Application No. PCT/EP2014/062990 dated Oct. 2, 2014.

International Preliminary Report on Patentability for International Application No. PCT/EP2014/062990 mailed Sep. 30, 2015.

* cited by examiner

SUBSEA SWITCHGEAR

PRIORITY STATEMENT

This application is the national phase under 35 U.S.C. §371 of PCT International Application No. PCT/EP2014/062990 which has an International filing date of Jun. 20, 2014, which designated the United States of America and which claims priority to European patent application number EP13178033.0 filed Jul. 25, 2013, the entire contents of which are hereby incorporated herein by reference.

FIELD

An embodiment of present invention generally relates to a subsea switchgear for providing electric power to a load. It further generally relates to a method of operating a subsea switchgear.

BACKGROUND

Due to the increasing energy demands, offshore oil and gas production is moving into deeper waters. For ensuring an efficient and secure production from a subsea well, processing facilities are being installed at the ocean floor. Such subsea installations can comprise a range of components, including pumps, compressors, and the like as well as a power grid for providing such components with electric power. Such power grid may for example comprise a subsea transformer, subsea switchgear and subsea variable speed drives. The components of the subsea installation need to be protected from the surrounding seawater, in which pressures of up to 300 bar or more can prevail, e.g. at installation depths of 3.000 m or more.

Other components that may need to be supplied with electric power include control components, such as subsea control units, communication equipment, sensors and the like. In conventional power distribution systems, a fault in the system generally causes a blackout of the complete system. Accordingly, the subsea installation is no longer operable and production must be stopped. This may lead to significant financial losses for the operator of the subsea well.

Accordingly, it is desirable to supply electric power to the components of a subsea installation with high reliability. In particular, a complete blackout of the subsea power grid should be prevented. Furthermore, it is also desirable to allow the servicing of individual components of such subsea installation without the need to completely shut down the subsea power grid.

SUMMARY

Accordingly, the inventor has recognized that there is a need for improved power distribution at a subsea installation, in particular for a power distribution that has improved reliability and enables servicing without complete shutdown.

The claims describe embodiments of the invention.

According to an embodiment of the invention, a subsea switchgear is provided which comprises a first power input for receiving electric power from a power source, a power distribution bus and a first circuit breaker coupled between the first power input and the power distribution bus. The first circuit breaker is configured to be capable of disconnecting the first power input from the power distribution bus. Furthermore, the subsea switchgear comprises a second power input for receiving electric power from a power source and a second circuit breaker coupled between the second power input and the power distribution bus. The second circuit breaker is configured to be capable of disconnecting the second power input from the power distribution bus. Furthermore, a power output for supplying electric power to a load is provided. The power output is coupled to the power distribution bus. The subsea switchgear is configured to selectively supply electric power to the power output from the first power input or the second power input. In an embodiment, it may furthermore be configured to selectively supply electric power to the power output from both the first power input and the second power input.

According to a further embodiment of the invention, a method of operating a subsea switchgear is provided. The subsea switchgear comprises a first power input for receiving electric power from a power source, a power distribution bus, a first circuit breaker coupled between the first power input and the power distribution bus, a second power input for receiving electric power from a power source, a second circuit breaker coupled between the second power input and the power distribution bus, and a power output for supplying electric power to a load, the power output being coupled to the power distribution bus. The method comprises the steps of receiving electric power on the first power input and supplying the received electric power to the power output; opening the first circuit breaker; receiving electric power on the second power input and supplying the received electric power to the power output. By way of such method, advantages similar to the ones outlined further above with respect to the subsea switchgear may be achieved.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF THE EXAMPLE EMBODIMENTS

According to an embodiment of the invention, a subsea switchgear is provided which comprises a first power input for receiving electric power from a power source, a power distribution bus and a first circuit breaker coupled between the first power input and the power distribution bus. The first circuit breaker is configured to be capable of disconnecting the first power input from the power distribution bus. Furthermore, the subsea switchgear comprises a second power input for receiving electric power from a power source and a second circuit breaker coupled between the second power input and the power distribution bus. The second circuit breaker is configured to be capable of disconnecting the second power input from the power distribution bus. Furthermore, a power output for supplying electric power to a load is provided. The power output is coupled to the power distribution bus. The subsea switchgear is configured to selectively supply electric power to the power output from the first power input or the second power input. In an embodiment, it may furthermore be configured to selectively supply electric power to the power output from both the first power input and the second power input.

In such configuration, it may be possible to disconnect either power source from the power distribution bus, thus enabling the continued operation of the power distribution even if one power source becomes unavailable, e.g. due to a blackout or due to servicing. Furthermore, by being capable of supplying electric power to the load from both power sources, loads having higher power ratings may be operated.

In an embodiment, the power source coupled to the first power input may be a first power source which is different the second power source coupled to the second power input. As an example, power may be supplied to the first power input and to the second power input from two different subsea transformers, from two different subsea cables, from two different umbilicals or any combination thereof.

The subsea switchgear may be configured to control the switching of the first circuit breaker and of the second circuit breaker such that it is capable of selectively supplying the electric power to the power distribution bus from either power source.

In an embodiment, the subsea switchgear may further comprise an output circuit breaker coupled between the power distribution bus and the power output. The output circuit breaker may be configured to be capable of disconnecting the power output from the power distribution bus. In such configuration, if a fault occurs within a load coupled to the power output, the faulty load can be disconnected, thereby ensuring the operability of the remaining power system. Accordingly, the reliability may be improved.

Plural power outputs may be coupled to the power distribution bus. An output circuit breaker may be provided for some of these plural power outputs or for each of the plural power outputs. Some power outputs may be directly connected to the power distribution bus, i.e. some loads may be directly connected to the power distribution bus.

In an embodiment, the power distribution bus comprises at least two bus sections. The first power input is connected to a first bus section and the second power input is connected to a second bus section. The first and the second bus sections are interconnected via a bus circuit breaker. The bus circuit breaker is configured to be capable of electrically disconnecting the first bus section from the second bus section. In such configuration, reliability and availability of the power system can further be improved. As an example, if a fault develops on a load coupled to one section of the power distribution bus or within the bus section itself, the bus circuit breaker may be opened to isolate this fault within the bus section. Accordingly, the remaining bus section(s) can remain operable and can continue to supply electric power from the power source to the power outputs coupled to the respective bus section(s). In some embodiments, more than two bus sections may be provided and may be connected to each other via bus circuit breakers. The power sources may be connected to the ends of such chain of bus sections.

In such configuration, each bus section may be connected to a power output for providing electric power to a load. It should be clear that some bus sections may also be connected to plural power outputs for providing electric power to plural loads. Each of these bus sections may furthermore be separable in two bus subsections, for example by additional circuit breakers positioned between the bus subsections. Each bus subsections may for example be coupled to one or more power outputs. Accordingly, an even higher reliability may be achieved by being able to isolate a fault within a bus subsection.

In an embodiment, the subsea switchgear is configured such that a power output coupled to the first bus section can be fed with electric power from the first power input and a power output coupled to the second bus section can be fed with electric power from the second power input. Upon separation of the two bus sections by way of the bus circuit breaker, each of these two power outputs can continue to be supplied with electric power. Accordingly, if one bus section needs to be shut down, the other remains operable, so that the required power shutdown can be limited to 50% or less of the power system.

The switchgear may be configured such that upon opening the bus circuit breaker, the power distribution bus is separated into two independent power distribution systems. Besides preventing a complete shutdown of the power system, it may thus also be possible to service components connected to one of the bus sections, or to provide electric power with different parameters on either bus section (e.g. different voltage, frequency, or the like).

According to an embodiment, the subsea switchgear further comprises at least one secondary circuit breaker connected between one of the circuit breakers and the power distribution bus. By way of such secondary circuit breaker, it may be possible to isolate a component of the power system by opening the secondary circuit breaker, thus limiting the propagation of a fault and ensuring that most of the power system remains operable.

As an example, the subsea switchgear may comprise a secondary circuit breaker connected between the first bus section and the bus circuit breaker and a further secondary circuit breaker connected between the second bus section and the bus circuit breaker. In such configuration, even if the bus circuit breaker fails, e.g. due to an electrical fault or due to the ingress of seawater, it may be isolated from the sections of the power distribution bus, so that either section of the power distribution bus remains operable.

In a further example, the subsea switchgear may comprise a secondary circuit breaker connected between the first circuit breaker and the power distribution bus. It may comprise a further secondary circuit breaker connected between the second circuit breaker and the power distribution bus. Accordingly, if the first or the second circuit breaker should suffer from a fault or become inoperable, the secondary circuit breakers can ensure that operation of the power system can continue, e.g. by isolating the faulty circuit breaker. Reliability of the power distribution via the subsea switchgear can thus be improved.

In an embodiment, the subsea switchgear is a modular subsea switchgear comprising at least a first CB (circuit breaker) module which includes the first circuit breaker, a second CB module which includes the second circuit breaker. It may further comprise a first distribution module which includes a first section of the power distribution bus and a second distribution module which includes a second section of the power distribution bus. Such modular approach may allow the subsea switchgear to be expanded and to be configured in accordance with the particular application. As an example, between the first CB module and the second CB module, further distribution modules may be added for allying the distribution of electric power to further loads, or further CB modules may be added for allying the electrical isolation of other CB modules or of distribution modules or the like.

The power output can be provided as an interface on the power distribution module, e.g. by way of a connector or the like. In other configurations, a load may be comprised in a module which is mounted to such distribution module. In even other configurations, the load may be comprised within a power distribution module. Similarly, the above mentioned output circuit breaker can be provided within the distribution module, yet it may also be provided as a separate module which is mounted to the distribution module. Furthermore, the above mentioned secondary circuit breakers may also be provided as a module, i.e. as secondary CB modules. As an example, each CB module that is connected between two distribution modules may comprise a section of the power distribution bus.

A daisy chain configuration of the subsea switchgear may thus be provided, in which different modules are connected in a row (one after the other). Additional modules, such as the above mentioned output CB modules or load modules, may then be connected as branches to such row, e.g. to respective power distribution modules.

In an embodiment, each module comprises a subsea enclosure for protecting a chamber located inside the subsea enclosure against surrounding water when the subsea switchgear is installed subsea. As an example, each such subsea enclosure may comprise a flange at an end thereof, and the flanges of the enclosures of the adjacent modules may be connected together, e.g. bolted together, to form the subsea switchgear.

The subsea enclosure may be filled with a dielectric liquid. Accordingly, the subsea enclosure may be provided as a pressure compensated enclosure in which the internal pressure is balanced to the external pressure (i.e. the pressure in the surrounding sea water when installed subsea), e.g. by way of a pressure compensator. In such configuration, the subsea enclosure can be provided with relatively thin walls and can be deployed at considerable water depths, for example up to or even in excess of 3.000 m. Furthermore, the dielectric liquid may provide improved cooling of the electric components within the subsea enclosures, and may furthermore reduce arcing in case of a fault.

In an embodiment, the subsea switchgear may comprise modules configured to provide separation between a medium, in particular the above mentioned dielectric liquid, filling the enclosure of an adjacent module and a medium filling the enclosure of said module or of a further adjacent module. Contaminated dielectric liquid may thus be confined to within a module.

As an example, if a module has an enclosure which is to be connected on either side thereof to another module, the enclosure may have two openings surrounded by two flanges. One of these openings may be closed off by a wall, e.g. by some type of membrane, diaphragm, by a metal wall or the like. Bushings and/or penetrators may then be provided to lead the electric connections, i.e. the power distribution bus, through such wall to the adjacent module. Accordingly, by use of such wall, a separation between the medium filling the enclosure and the medium filling an adjacent enclosure can be provided. If a fault develops in one of the modules, a degradation of the medium may result, e.g. a pollution of the above mentioned dielectric liquid due to arcing, so that a degradation of the medium in the other modules can be prevented by way of the separation provided by the wall.

As an example, one or more (or even all) of the modules comprising the secondary circuit breakers may provide such separation, i.e. such secondary CB module may comprise a separating wall at one or both sides of its enclosure at which it is connected to an adjacent module.

According to an embodiment, the power distribution bus is provided by several electric modules connected to each other in a daisy chain configuration. A high flexibility in the configuration of the subsea switchgear may thus be achieved, i.e. the subsea switchgear may, by this modular approach, be configured in accordance with the respective application. Also, the servicing of individual components of the subsea switchgear may be facilitated.

In another embodiment, the power distribution bus may comprise busbars to which the first and second power input and the power output are coupled. A power distribution with reduced complexity may thus be achieved. Also, by providing such busbars, electric energy may be distributed efficiently.

In other embodiments, the busbars may comprise separate sections of busbars to enable a separation of the power distribution bus into different bus sections. As an example, each bus section or each bus subsection can comprise busbars. Furthermore, also in this configuration, a modular approach is possible: a distribution module may then for example comprise busbars. A distribution module comprising a section of the power distribution bus which is implemented with busbars may be provided, and several power outputs may be connected to these busbars.

In an embodiment, the circuit breakers are medium voltage breakers. In particular, they may be operable at a voltage within a voltage range of about 500 V to about 50.000 V, in particular of about 1.000 V to about 40.000 V.

The subsea switchgear can be configured for AC power distribution. In particular, it may be configured to distribute three phase AC electric power, and the power distribution bus may accordingly comprise a bus for each phase. In other embodiments, the subsea switchgear may be configured for DC power distribution.

According to a further embodiment of the invention, a method of operating a subsea switchgear is provided. The subsea switchgear comprises a first power input for receiving electric power from a power source, a power distribution bus, a first circuit breaker coupled between the first power input and the power distribution bus, a second power input for receiving electric power from a power source, a second circuit breaker coupled between the second power input and the power distribution bus, and a power output for supplying electric power to a load, the power output being coupled to the power distribution bus. The method comprises the steps of receiving electric power on the first power input and supplying the received electric power to the power output; opening the first circuit breaker; receiving electric power on the second power input and supplying the received electric power to the power output. By way of such method, advantages similar to the ones outlined further above with respect to the subsea switchgear may be achieved.

In an embodiment, the steps of receiving electric power on the first power input and receiving electric power on the second power input may be performed simultaneously, i.e. a load may be supplied with electric power form both power inputs. The step of opening the first circuit breaker may for example be performed upon occurrence of a predetermined condition, e.g. upon the detection of a fault, upon receiving a corresponding control signal, or the like. Accordingly, the first circuit breaker may for example be opened in response to a failure in the switchgear or a load, or a blackout of the power supply, or if service work is necessary on a component of or coupled to the subsea switchgear, or if a reconfiguration of the subsea switchgear or a component coupled thereto is necessary or the like.

In an embodiment of the method, the power distribution bus may comprise at least two bus sections, the first power input being connected to a first bus section and the second power input being connected to a second bus section. The first and the second bus sections are interconnected via a bus circuit breaker. Each bus section is connected to a power output. The method may further comprise the steps of operating the subsea switchgear with the first and/or second circuit breakers closed; opening the bus circuit breaker; receiving electric power on the first power input and supplying the received electric power to the power output coupled to the first bus section and/or receiving electric power on the second power input and supplying the received electric power to the power output coupled to the second bus section. In such method, if a fault in one bus section or a component coupled thereto occurs, the load coupled to the other bus section can accordingly still be supplied with electric power.

The features of the embodiments of the invention mentioned above and those yet to be explained below can be combined with each other unless noted to the contrary. In particular, the subsea switchgear may be configured to perform embodiments of the above outlined method. Furthermore, embodiments of the method may be performed by way of a subsea switchgear in any of the above described configurations.

In the following, embodiments of the invention will be described in detail with reference to the accompanying drawings. It is to be understood that the following description of the embodiments is given only for the purpose of illustration and is not to be taken in a limiting sense. The drawings are to be regarded as being schematic representations only, and elements in the drawings are not necessarily to scale with each other. Rather, the representation of the various elements is chosen such that their function and general purpose become apparent to a person skilled in the art.

Figure 1:
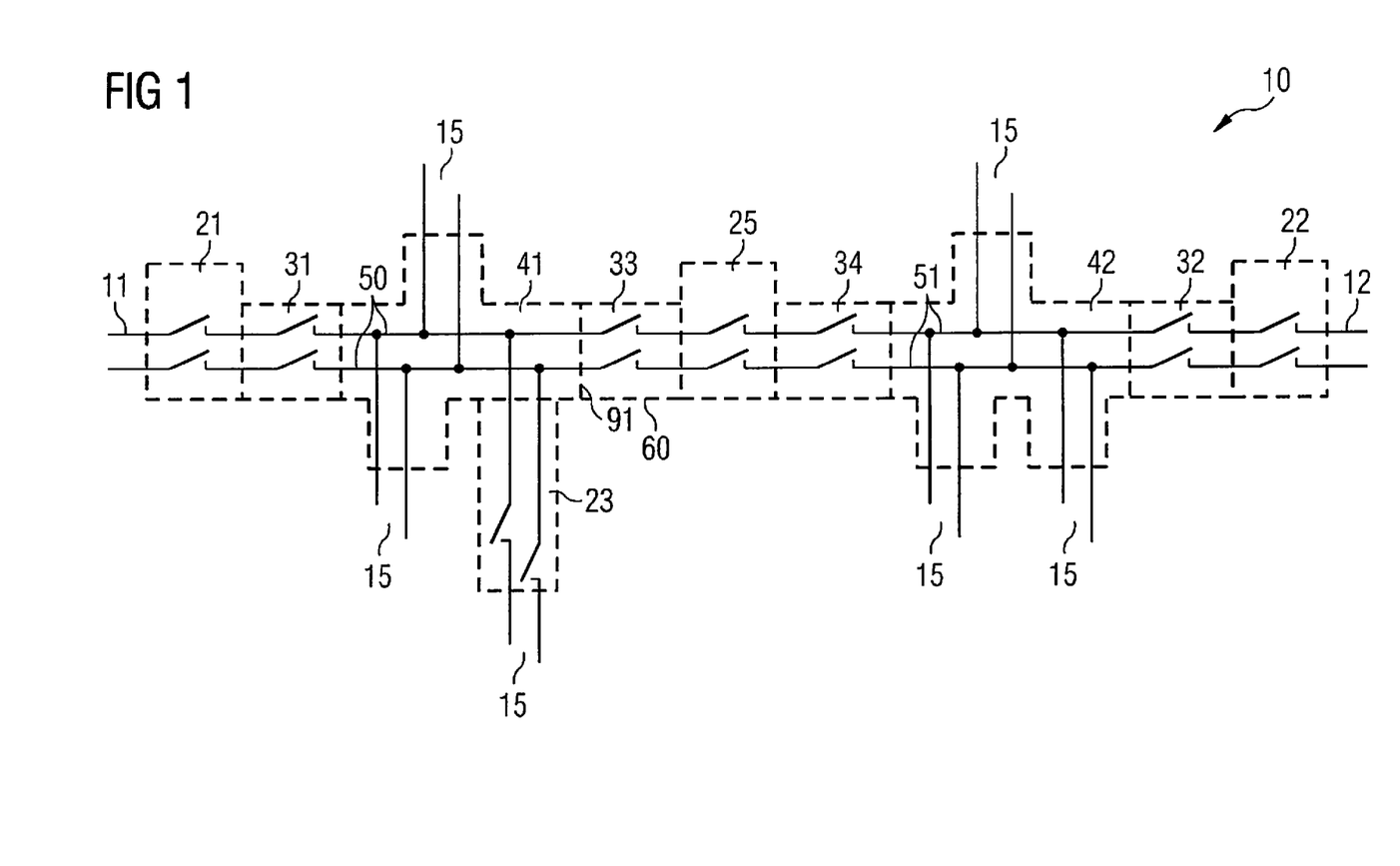
FIG. 1 is a schematic drawing showing a subsea switchgear according to an embodiment of the invention.

In the schematic bloc diagram of FIG. 1, an embodiment of the subsea switchgear 10 is illustrated. The subsea switchgear 10 comprises a first power input 11 for receiving electric power from a power source and a second power input 12 for receiving electric power from a power source. The power source coupled to power input 11 can be different from the power source coupled to power input 12. Power may for example be received from a subsea transformer, an umbilical, a subsea cable or the like.

The subsea switchgear 10 comprises a power distribution bus 50 which essentially extends through the subsea switchgear from the first power input 11 to the second power input 12. A first circuit breaker 21 is coupled between the power distribution bus 50 and the first power input 11, and a second circuit breaker 22 is coupled between the power distribution bus 50 and the second power input 12. Accordingly, either power input 11 or 12 can be disconnected from the power distribution bus 50, e. g. upon occurrence of a fault in the power source or the associated cabling or the like. In such situation, the power distribution bus 50 can be fully powered from the other power input, so that the whole system remains operable. Accordingly, loads coupled to the power distribution bus 50 via one of the power outputs 15 can still be supplied with electric power. In normal operation, it is possible to supply loads coupled to power outputs 15 either via the first power input 11, the second power input 12 or both. A redundancy in the power supply is thus achieved.

The power output 15 can for example be provided in form of a connector. In other implementations, a load may be directly connected to the power distribution bus 50. For some applications, an output circuit breaker 23 can be provided between the power output 15 and the power distribution bus 50. Accordingly, electric power supplied to a load connected to such power output 15 can be switched, or the load can be disconnected from the power distribution bus 50, e. g. upon occurrence of a fault in the load or for protecting the load.

In the embodiment of FIG. 1, the power distribution bus 50 is separated into a first bus section 41 and a second bus section 42. The first and second bus sections 41, 42 are connected to each other via the bus circuit breaker 25. Accordingly, bus circuit breaker 25 allows the selective connection and disconnection of the first and second bus sections 41, 42. Upon occurrence of a fault in one of the bus sections 41, 42, or in a load coupled thereto, the circuit breaker 25 may be opened and thus isolate the faulty bus section from the remaining bus section. Consequently, part of the subsea switchgear remains operable, and can continue to supply electric power to the loads connected thereto. Furthermore, it is possible to separate the subsea switchgear 10 into two independent power systems by opening the bus circuit breaker 25. In such configuration, the loads coupled to one of the bus sections 41 or 42 can be switched off by opening the circuit breaker 21 or 22, respectively. One part of the subsea switchgear 10 can thus be shut down, for example for servicing components coupled thereto or for servicing parts of the subsea switchgear 10.

The power distribution bus 50 can be provided in form of busbars 51. In the example of FIG. 1, only two busbars are schematically illustrated. Yet subsea switchgear 10 may be provided with any configuration of a power distribution bus in accordance with the particular application. As an example, it may comprise three busbars for three phase AC power distribution, or two busbars for DC power distribution.

Each section of power distribution bus 41, 42 may comprise a section of busbars 51. In some embodiments, the busbar sections may extend to the bus circuit breaker 25 or the secondary circuit breaker 33, 34. In other embodiments, e.g. when the subsea switchgear uses a modular approach, the busbar section may only extend within a module, e.g. within a power distribution module. In other embodiments, electric cables or the like may be used instead of busbars.

The bus circuit breaker 25 can prevent fault propagation and in case a fault occurs, can prevent that the switchgear 10 needs to be shut down by 100%. Only 50% of the subsea switchgear 10 would need to be shut down in the example of FIG. 1.

Subsea switchgear 10 may furthermore comprise secondary circuit breakers, such as circuit breakers 31, 32, 33 and 34. Secondary circuit breakers 33 and 34 are coupled between the bus circuit breaker 25 at the first bus section 41 and the second bus section 42, respectively. Accordingly, the bus circuit breaker 25 can be isolated from the remaining parts of the subsea switchgear 10, in particular from the first and second bus sections 41 and 42, by opening the secondary circuit breakers 33 and 34. Bus circuit breaker can then be serviced or exchanged, while the subsea switchgear 10 remains fully operable.

Furthermore, secondary circuit breakers 31 and 32 can for example be provided between the first and second circuit breakers 21 and 22 and the first and second bus sections 41 and 42, respectively. In such configuration, the respective circuit breaker 21 or 22 can be electrically isolated from the remaining parts of the subsea switchgear 10, which can for example allow the servicing of the respective circuit breaker while the remainder of the subsea switchgear 10 remains operable. For example, the power supplied to power input 11 may be shut down and the secondary circuit breaker 31 may be opened. Circuit breaker 21 can then be serviced or exchanged.

Secondary circuit breakers 31 to 34 may be configured to break the electrical connection when the respective circuit breaker is not powered, i. e. when power to the respective secondary circuit breaker is shut off (no-load circuit breaker). The secondary circuit breakers 31 to 34 may for example be busbar breakers. The secondary circuit breakers 31 to 34 may also be considered to be isolators which can be controlled from a remote location.

The circuit breakers 21, 22 and 25 can be configured to be operable under load, i. e. when power is being supplied through these circuit breakers when these circuit breakers are closed (on-load breakers). Accordingly, these circuit breakers 21, 22 and 25 can be used for actively switching the supply with electric power to the loads or to parts of the subsea switchgear 10.

As illustrated in FIG. 1, the subsea switchgear 10 may be a modular subsea switchgear in which different components thereof are provided as modules. This modular approach will allow a flexible configuration of the subsea switchgear 10 and an expansion thereof in dependence on the particular application. As illustrated, the circuit breakers 21, 22 and 25 may be provided as individual modules; the secondary circuit breakers 31 to 34 may be provided as individual modules; distribution modules may be provided which comprise sections of the power distribution bus 50 and provide power outputs 15; load modules may be provided which can be connected to e. g. the distribution modules, for example to the power outputs 15 provided at the distribution modules and the like. Note that some modules may integrate several components; a module may for example comprise both a section of the power distribution bus 50 and a circuit breaker, such as a secondary circuit breaker 31, an output circuit breaker 23, an input circuit breaker 21 or the like. Also, a load may be provided within the same module that comprises part of the power distribution bus 50.

Each module may comprise a subsea enclosure 60, which is only schematically illustrated in FIG. 1. Adjacent modules may be mounted to each other, as will be explained in more detail with reference to FIG. 2. Between the modules, a separating wall 91 may be provided, the wall can be part of the subsea enclosure 60 of one of the modules. Each module can be filled with a dielectric fluid, in particular a dielectric liquid. By use of the wall 91, it is possible to also isolate the dielectric fluid between the modules, in addition to allowing an isolation of the electric power by way of the circuit breakers and the secondary circuit breakers. Accordingly, a leakage of seawater into the dielectric fluid in one of the modules can be contained, and the influence on such leakage on other modules can be minimized. Additional safety against water ingress and the pollution of dielectric fluid can thus be achieved, and the provided redundancy ensures that the unaffected units can remain operable. Again, the reliability of the subsea switchgear 10 can be improved.

Note that such separating walls 91 may be provided at several locations throughout the subsea switchgear 10. In the particular example of FIG. 1, such a wall 91 may for example be provided to both sides of the bus circuit breaker 25, so that if water leaks into the circuit breaker 25, it cannot enter the adjacent modules, e. g. a distribution module comprising first bus section 41 or distribution module comprising the second bus section 42.

Figure 2:
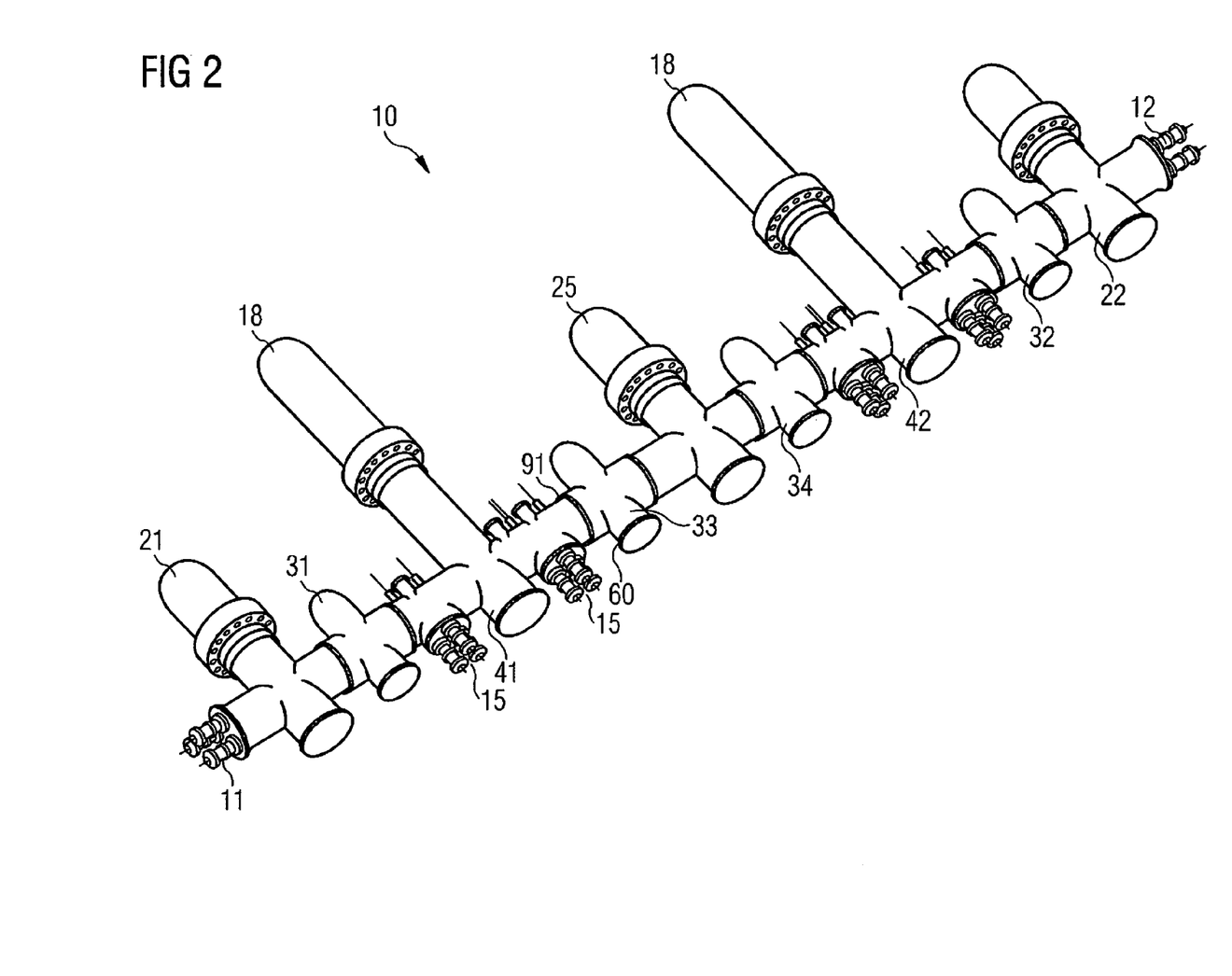
FIG. 2 is a schematic drawing showing a perspective view of a subsea switchgear according to an embodiment of the invention.

FIG. 2 shows a perspective view of a particular implementation of the subsea switchgear 10 of FIG. 1. Accordingly, all explanations given above with respect to the subsea switchgear 10 of FIG. 1 are equally applicable to the embodiment illustrated in FIG. 2.

Power input 11 and power input 12 may for example be provided by electrical connectors, e. g. dry-mate or wet-mate connectors. FIG. 2 illustrates the subsea enclosures of the individual modules comprising e. g. circuit breakers, bus sections, secondary circuit breakers and the like. Modules 18 may for example comprise loads coupled to the power output of a bus section 41 or 42 comprised within the respective distribution module. Other power outputs may again be provided by wet-mate or dry-mate connectors. As can be seen, each module has an individual subsea enclosure. The subsea enclosure comprises an opening surrounded by a flange, using which the subsea enclosure is mounted to the subsea enclosure of the adjacent module. For example, a bolted connection may be provided for mounting one flange to the other.

In some embodiments, the subsea enclosures may be open at the locations at which they are connected to adjacent subsea enclosures, the electrical connections passing through such opening. Cables or busbars may for example pass through these openings from one module to the next module. In other embodiments, as explained above, separating walls 91 may be provided for sealing off these openings. In such separating walls 91, bushings or penetrators can be used to guide the electrical connections through the separating walls. On one hand, without separating walls, a less complex configuration can be achieved. On the other, providing separating walls 91 has the advantage that the flow of fluid inside the subsea enclosures can be limited to the respective module, thereby preventing the distribution of seawater throughout the subsea switchgear 10 if one of the modules suffers from a leakage.

Circuit breakers 21, 22 and 25 may for example comprise vacuums circuit breakers provided in their individual housings and mechanically mounted to a further subsea housing which comprises a section of the power distribution bus. Other suitable circuit breakers capable of switching the electric power on-load may also be used.

With respect to FIGS. 3, 4 and 5, methods of operating the subsea switchgear 10 will be described hereinafter. The subsea switchgear can have the configuration as described above with respect to FIG. 1 or 2. Since these methods can be performed on the subsea switchgear 10 of FIGS. 1 and 2, the explanations given above are equally applicable.

Figure 3:
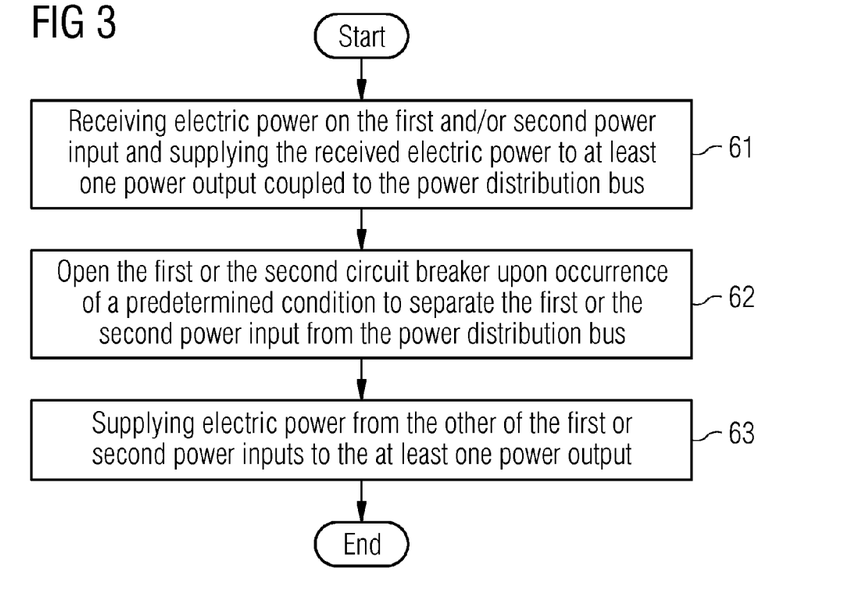
FIG. 3 is a flow diagram illustrating a method according to an embodiment of the invention.

In the method illustrated in the flow diagram of FIG. 3, electric power is received on the first and/or second power input in a first step 61, and is supplied to at least one power output coupled to the power distribution bus. Accordingly, a load coupled to the subsea switchgear can be supplied with electric power either via the first, via the second or via both power inputs.

In the next step 62, the first or the second circuit breaker 21, 22 is opened upon occurrence of a predetermined condition to separate the first or the second power input from the power distribution bus. Such predetermined condition may for example be the detection of a fault, e. g. a fault in the load or in a power source. By opening the CB 21 or 22, the remaining parts of the power system are protected. As an example, if a fault in a load occurs, opening the respective first and/or second circuit breaker 21, 22 may protect a subsea transformer which provides electric power to the subsea switchgear 10. On the other hand, if a fault occurs in the power source, such as in a subsea transformer, it can be prevented that the subsea switchgear 10 needs to be shut down completely, but operation can continue via the other power input with electric power being supplied by the other power source. Another predetermined condition may for example be the reception of a corresponding control signal. Such signal may for example be submitted from a topside installation or an on-shore site. Accordingly, the system may be powered down or parts of the system may be powered down, so that servicing a load, a power source or the subsea switchgear 10 becomes possible.

In step 63, electric power is supplied from the other of the first or second power inputs to the at least one power output. Accordingly, if one power source is disconnected, the remaining parts of the subsea switchgear and thus the loads connected thereto remain operable.

Figure 4:
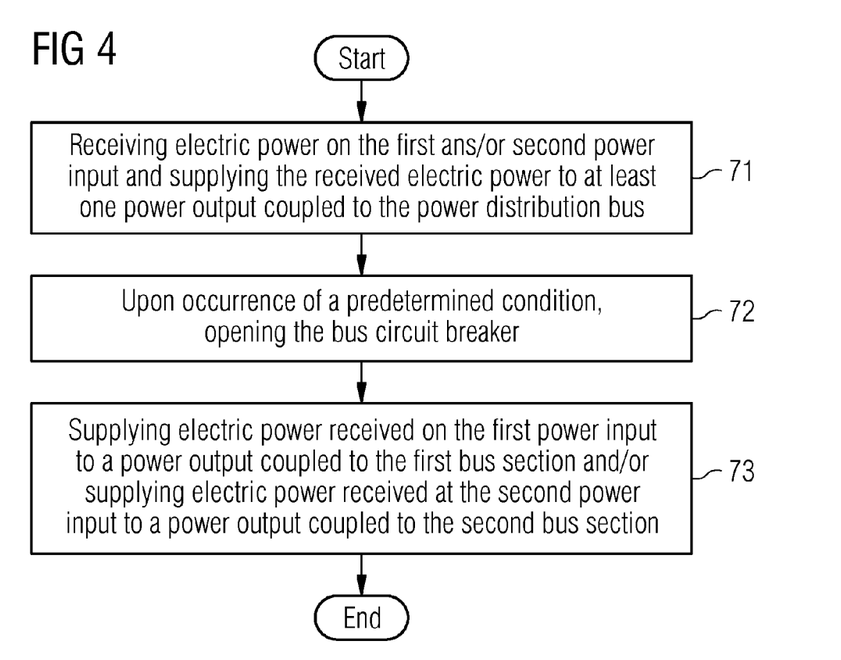
FIG. 4 is a flow diagram illustrating a method according to an embodiment of the invention.

In the embodiment of FIG. 4, electric power is received on the first and/or second power input in step 71, and the received electric power is supplied to at least one power output coupled to the power distribution bus. In the second step 72, the bus circuit breaker 25 is opened upon occurrence of a predetermined condition. Again, such condition may be a fault in the switchgear 10, in a load coupled thereto, in a power source or the like. Another possibility of the predetermined condition includes the reception of a corresponding control signal, as explained above.

In a next step 73, electric power received on the first power input is supplied to a power output coupled to the first bus section. Additionally or alternatively, electric power received at the second power input is supplied to a power output coupled to the second bus section. As an example, opening the circuit breaker 25 in response to a received control command can separate the subsea switchgear into two independent power systems, which may for example have benefits for redundant operation in a high risk situation or the like. In such case, both sections of the subsea switchgear remain operable and receive electric power on the respective first or second power inputs 11, 12. In other applications, one section of the subsea switchgear 10 may be shut down, while the other remains operable. Applications of such method include the fault occurring in one section of the subsea switchgear 10, for example in the power source, a load, or a circuit breaker, or the power distribution bus of the respective section, or the controlled shutdown of one part of the subsea switchgear 10 for servicing.

Figure 5:
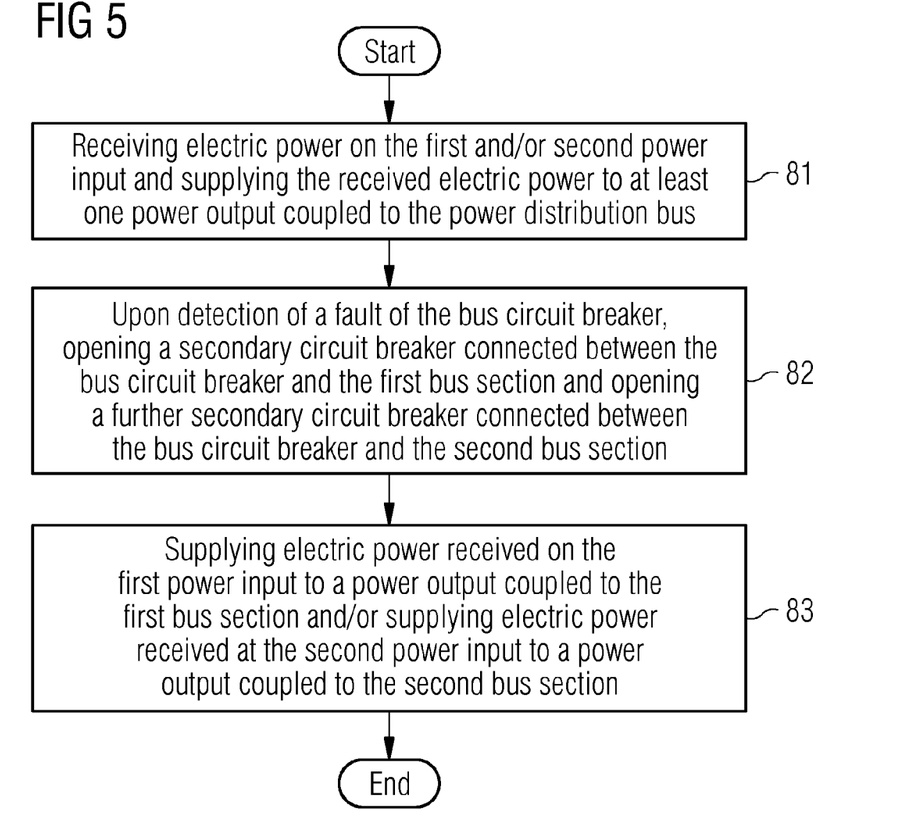
FIG. 5 is a flow diagram illustrating a method according to an embodiment of the invention.

In the embodiment illustrated in the flow diagram of FIG. 5, electric power is received on the first and/or second power input in a step 81 and is supplied to at least one power output coupled to the power distribution bus. In step 82, upon detection of the fault of the bus circuit breaker, secondary circuit breakers, e. g. circuit breakers 33 and 34, which are connected between the bus circuit breaker and the first bus section and the second bus section, are opened to electrically isolate the faulty bus circuit breaker. That is, before opening the secondary circuit breakers, the first and second circuit breakers 21 and 22 may be opened so as to de-energize the power distribution bus, so that the secondary circuit breakers can be opened in a no-load condition.

By electrically isolating the faulty bus circuit breaker from the remaining parts of the subsea switchgear 10, the subsea switchgear 10 essentially remains fully operational, since the loads coupled to the first bus section 41 and the loads coupled to the second bus section 42 can still be supplied with electric power via the first and second power inputs 11, 12, respectively.

Accordingly, in a next step 83, electric power received on the first power input is supplied to a power output coupled to the first bus section and/or electric power received on the second power input is supplied to a power output coupled to the second bus section.

As can be taken from the above description, embodiments of the subsea switchgear 10 and of the above outlined methods provide an increased reliability of the supply of electric power to subsea loads via the subsea switchgear 10, and furthermore provide a redundant operation. Due to the modular construction, the subsea switchgear 10 can be adapted to the particular application. Furthermore, the servicing or exchange of individual modules becomes possible, while the subsea switchgear 10 remains operational. Also, a blackout or fault in one component of the subsea switchgear 10 or of a component coupled thereto does not lead to a complete blackout of the power supply, but parts of the subsea switchgear 10 can remain operational and can continue to supply electric power to loads.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A subsea switchgear, comprising:
a first power input to receive a first electric power from a first power source;
a power distribution bus;
a first circuit breaker, coupled between the first power input and the power distribution bus, configured to disconnect the first power input from the power distribution bus;
a second power input to receive a second electric power from a second power source;
a second circuit breaker, coupled between the second power input and the power distribution bus, configured to disconnecting the second power input from the power distribution bus; and
a power output to supply at least one of the first electric power or the second electric power to a load, the power output being coupled to the power distribution bus,
wherein the subsea switchgear is configured to selectively supply at least one of the first electric power or the second electric power to the power output from the first power input or the second power input,
wherein the subsea switchgear is a modular subsea switchgear comprising a plurality of modules including at least a first circuit breaker module including the first circuit breaker, a second circuit breaker module including the second circuit breaker, a first distribution module including a first section of the power distribution bus and a second distribution module including a second section of the power distribution bus, and
wherein each of the plurality of modules comprises a subsea enclosure to protect an inner volume located inside the subsea enclosure against surrounding water when the subsea switchgear is installed subsea, wherein the subsea enclosures of adjacent ones of the plurality of modules are connected together and wherein the plurality of modules provide separation by a wall or by controllable separation between a medium filling the subsea enclosure of a respective one of plurality of modules and a medium filling the subsea enclosure of an adjacent one of the plurality of modules, the adjacent one of the plurality of modules being adjacent to the respective one of plurality of modules.

2. The subsea switchgear of claim 1, further comprising:
an output circuit breaker coupled between the power distribution bus and the power output, wherein the output circuit breaker is configured to disconnect the power output from the power distribution bus.

3. The subsea switchgear of claim 2, wherein the power distribution bus comprises at least two bus sections, the first power input being connected to a first of the at least two bus sections of the first section of the power distribution bus and the second power input being connected to a second of the at least two bus sections of the second section of the power distribution bus, wherein the first and the second bus sections are interconnected via a bus circuit breaker, the bus circuit breaker being configured to electrically disconnect the first bus section from the second bus section.

4. The subsea switchgear of claim 3, wherein the subsea switchgear is configured to feed a power output coupled to the first bus section with the first electric power from the first power input and to feed a power output coupled to the second bus section with the second electric power from the second power input.

5. The subsea switchgear of claim 4, wherein the subsea switchgear is configured such that upon opening the bus circuit breaker, the power distribution bus is separated into two independent power distribution systems.

6. The subsea switchgear of claim 2, wherein the subsea enclosure of the first distribution module comprises a flange by which the subsea enclosure of the first distribution module is mounted to a corresponding flange of the subsea enclosure of the second distribution module.

7. The subsea switchgear of claim 2, wherein the first section and the second section of the power distribution bus are at least partly formed by continuous bus bars reaching from the first distribution module into the second distribution module or by a flexible busbar section connecting busbar sections in the first and second distribution modules.

8. The subsea switchgear of claim 1, wherein the power distribution bus comprises at least two bus sections, the first power input being connected to a first of the at least two bus section of the first section of the power distribution bus and the second power input being connected to a second of the at least two bus sections of the second section of the power distribution bus, wherein the first and the second bus sections are interconnected via a bus circuit breaker, the bus circuit breaker being configured to electrically disconnecting the first bus section from the second bus section.

9. The subsea switchgear of claim 8, wherein the power output includes a first power output and a second power output, and wherein the subsea switchgear is configured to feed the first power output coupled to the first bus section with the first electric power from the first power input and to feed the second power output coupled to the second bus section with the second electric power from the second power input.

10. The subsea switchgear of claim 9, wherein the subsea switchgear is configured such that upon opening the bus circuit breaker, the power distribution bus is separated into two independent power distribution systems.

11. The subsea switchgear of claim 8, wherein the subsea switchgear is configured such that upon opening the bus circuit breaker, the power distribution bus is separated into two independent power distribution systems.

12. The subsea switchgear of claim 8, wherein the subsea switchgear further comprises at least one secondary circuit breaker connected between one of said first, second or bus circuit breakers and the power distribution bus.

13. The subsea switchgear of claim 12, further comprising:
a secondary circuit breaker connected between the first bus section and the bus circuit breaker; and
a further secondary circuit breaker connected between the second bus section and the bus circuit breaker.

14. The subsea switchgear of claim 13, further comprising:
a secondary circuit breaker connected between the first circuit breaker and the power distribution bus; and
a further secondary circuit breaker connected between the second circuit breaker and the power distribution bus.

15. The subsea switchgear of claim 12, further comprising:
a secondary circuit breaker connected between the first circuit breaker and the power distribution bus; and
a further secondary circuit breaker connected between the second circuit breaker and the power distribution bus.

16. The subsea switchgear of claim 1, wherein the subsea enclosure of the first distribution module comprises a flange by which the subsea enclosure of the first distribution module is mounted to a corresponding flange of the subsea enclosure of the second distribution module.

17. The subsea switchgear of claim 1, wherein the first section and the second section of the power distribution bus are at least partly formed by continuous bus bars reaching from the first distribution module into the second distribution module or by a flexible busbar section connecting busbar sections in the first and second distribution modules.

18. The subsea switchgear of claim 1, wherein a connection between the first and second sections of the power distribution bus is provided by a bushing providing a connection through a wall provided between the inner volumes of the subsea enclosures of the first and second distribution modules.

19. The subsea switchgear of claim 1, wherein the medium is a dielectric liquid.

20. The subsea switchgear of claim 1, wherein the subsea switchgear comprises modules configured to provide controllable separation between a medium filling the subsea enclosure of an adjacent one of the plurality of modules and a medium filling the subsea enclosure of said module or of a further adjacent one of the plurality of modules, each of the said module or of the further adjacent one of the plurality of modules being adjacent to said adjacent one of the plurality of modules.

21. The subsea switchgear of claim 20, wherein the medium is a dielectric liquid, the dielectric medium fills the subsea enclosure of the adjacent one of the plurality of modules and the dielectric liquid fills a subsea enclosure of said module or of said further adjacent one of the plurality of modules.

22. The subsea switchgear of claim 21, wherein the controllable separation is provided by way of a controllable valve.

23. The subsea switchgear of claim 1, wherein the power distribution bus is provided by said modules, connected to other ones of the plurality of modules in a daisy chain configuration.

24. The subsea switchgear of claim 1, wherein the power distribution bus comprises busbars to which the first and second power inputs and the power output are coupled.

25. The subsea switchgear of claim 1, further comprising at least one secondary circuit breaker connected between one of said first, second or bus circuit breakers and the power distribution bus.

26. The subsea switchgear of claim 1, wherein the controllable separation is provided by way of a controllable valve.

27. A method of operating a subsea switchgear, the subsea switchgear including:
- a first power input to receive a first electric power from a first power source,
- a power distribution bus,
- a first circuit breaker coupled between the first power input and the power distribution bus, a second power input to receive a second electric power from a second power source,
- a second circuit breaker coupled between the second power input and the power distribution bus, and
- a power output to supply at least one of the first electric power or the second electric power to a load, the power output being coupled to the power distribution bus,
- wherein the subsea switchgear is a modular subsea switchgear including a plurality of modules including a first circuit breaker module which includes the first circuit breaker, a second circuit breaker module which includes the second circuit breaker, a first distribution module which includes a first section of the power distribution bus, and a second distribution module which includes a second section of the power distribution bus, and
- wherein each of the plurality of modules includes a subsea enclosure to protect an inner volume located inside the subsea enclosure against surrounding water when the subsea switchgear is installed subsea,
- wherein the subsea enclosures of adjacent ones of the plurality of modules are connected together, and
- wherein the plurality of modules provide separation by a wall or by controllable separation between a medium filling the subsea enclosure of a representative one of the plurality of modules and a medium filling the subsea enclosure of an adjacent one of the plurality of modules, the adjacent one of the plurality of modules being adjacent to the respective one of plurality of modules, the method comprising:
- receiving the first electric power on the first power input and supplying the received first electric power to the power output;
- opening the first circuit breaker; and
- receiving the second electric power on the second power input and supplying the received second electric power to the power output.

* * * * *